May 19, 1942.   G. R. ROESCH ET AL   2,283,289
GRINDING APPARATUS
Filed Aug. 12, 1941   3 Sheets-Sheet 1

Inventors
GEORGE R. ROESCH.
GERALD WHITE.
By Frank Fraser
Attorney

Inventors
GEORGE R. ROESCH.
GERALD WHITE.

Frank Fraser
Attorney

Patented May 19, 1942

2,283,289

UNITED STATES PATENT OFFICE 2,283,289

GRINDING APPARATUS

George R. Roesch and Gerald White, Toledo, Ohio, assignors to Libbey-Owens-Ford Glass Company, Toledo, Ohio, a corporation of Ohio Application August 12, 1941, Serial No. 406,487

13 Claims. (Cl. 51—124)

The present invention relates broadly to grinding apparatus and more particularly to an apparatus for grinding the edges of relatively small sheets or plates of glass and the like.

Although the invention is not limited to any specific use, it has been designed primarily for and is of especial utility in the edging of so-called glass mirror plates which are used in the making of rear view mirrors for automotive vehicles and the like. More particularly, the apparatus is adapted for grinding the opposite end edges and corners of prismatic mirror plates which are substantially triangular in cross section, each having the rear surface thereof plane and perpendicular with respect to the upper and lower edges of the plate and the front surface arranged at a slight angle with respect to the plane surface. The plane rear surface of the glass plate is provided with a suitable reflecting medium such as a silver coat. It has been found that such a mirror makes a very satisfactory rear view mirror for automotive vehicles and the like in that it greatly reduces, if not entirely eliminates, objectionable glare from the headlights of automobiles approaching in the rear.

In the manufacture of mirrors of this type by the company to which this application is assigned, a glass blank is first ground and polished to give a mirror plate of the desired triangular shape in cross section, after which the top and bottom longitudinal edges and then the opposite end edges and corners of the mirror plate are ground. A method and apparatus for surfacing the glass blanks to produce mirror plates of the desired triangular shape in cross section is disclosed in copending application Serial No. 403,634, filed July 23, 1941, while a machine for grinding the longitudinal top and bottom edges of the mirror plates is disclosed in copending application Serial No. 406,486, filed Aug. 12, 1941.

The primary object of this invention is the provision of an improved apparatus for grinding the opposite end edges and corners of the glass mirror plates rapidly, accurately, and economically.

Another important object of the invention is the provision of an edge grinding apparatus by means of which a plurality of the glass mirror plates may be simultaneously ground in a manner to obtain uniformly smooth and finished straight end edges and rounded corners.

Another important object of the invention is the provision of an edge grinding apparatus embodying a novel form of work-holder for supporting and firmly securing a plurality of the glass mirror plates in position to be operated upon and of such construction that the opposite end edges and four corners of the plates may be ground without the necessity of removing them from said work-holder or changing the relative positions thereof.

A further important object of the invention is the provision of an edge grinding apparatus embodying means for rockably supporting the work-holder during grinding in such a way that the amount of glass removed from the end edges and corners of the mirror plates is definitely and automatically controlled and is not dependent upon the skill of the operator.

A still further important object of the invention is to facilitate, expedite and improve generally the edging of relatively small sheets or plates of glass and the like provided with straight edges and rounded corners having a relatively small radius of curvature.

Other objects and advantages of the invention will become more apparent during the course of the following description when taken in connection with the accompanying drawings.

In the drawings wherein like numerals are employed to designate like parts throughout the same:

Figures 8, 9:
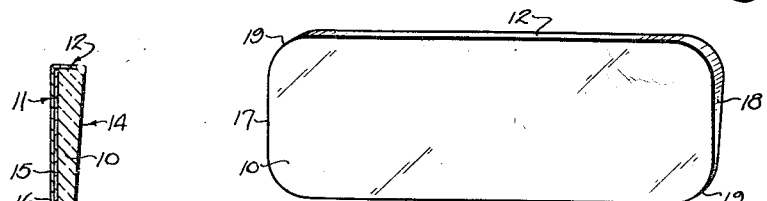
Fig. 8 is a perspective view of the mirror plate after grinding.
Fig. 9 is a transverse section of a prismatic mirror formed from one of the mirror plates.

With reference now to the drawings, there is shown in Fig. 9 a prismatic rear view mirror for automotive vehicles and the like comprising a glass plate 10 in the form of a triangular prismoid having a plane back surface 11 extending perpendicular with respect to the upper and lower longitudinal edges 12 and 13 thereof and a front surface 14 which is disposed at a slight angle with respect to the back surface 11. The back surface 11 is provided with any suitable type of reflecting media, such as a silver coat 15, covered by the usual protective backing 16 if desired.

Figures 6, 7:
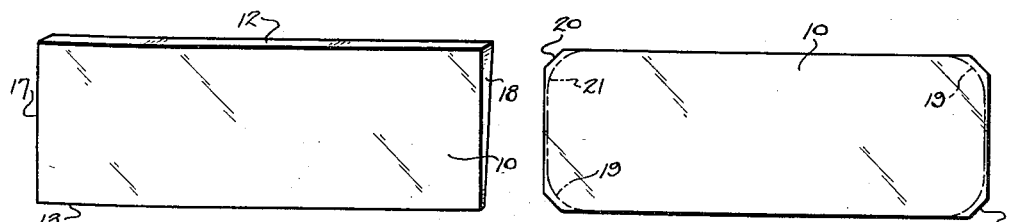
Fig. 6 is a perspective view of one of the glass mirror plates prior to the grinding of the opposite end edges and corners thereof.
Fig. 7 illustrates diagrammatically the manner in which the opposite end edges and corners of the mirror plate are to be ground.

In making this type of mirror, a glass blank is first ground and polished to provide the rectangular mirror plate 10 shown in Fig. 6, having the upper and lower longitudinal edges 12 and 13 and the opposite end edges 17 and 18. As stated above, the upper and lower edges 12 and 13 are perpendicular with respect to the back surface 11 and are preferably ground prior to the grinding of the end edges 17 and 18. After the longitudinal edges 12 and 13 have been ground, the opposite end edges 17 and 18 are then ground and the four corners 19 of the plate rounded in the manner shown in Fig. 8, whereupon the glass plate is ready to be silvered. To facilitate the rounding of the corners 19, the sharp edges are first removed as indicated at 20 in Fig. 7, and the grinding of the opposite end edges and corners then effected in such a manner that the said end edges and corners will be ground to the contour indicated by the broken lines 21 in Fig. 7.

In Figs. 1 to 5 is illustrated a preferred form of apparatus for grinding the opposite end edges 17 and 18 and for rounding the corners 19 of the glass mirror plates 10. Such apparatus includes generally a horizontal grinding wheel A rotatable about a vertical axis, while B designates in its entirety the work-holder for supporting the mirror plates 10 during the grinding operation; said work-holder being rockably carried by the supporting means C, while at D is shown the means for controlling the extent of rocking movement of the work-holder B.

The work holder B comprises a rectangular side member 22 provided upon its inner surface and at its opposite ends with the transverse ribs 23 and 24 and intermediate its ends with a similar but relatively narrower rib 25. Extending transversely of the side member 22 and arranged at opposite sides of rib 23 are the spaced parallel plates 25 and 26 between which are disposed the spaced parallel blocks 27 and 28, each block being secured to the plates 25 and 26 by screws 29 and 30 passing through said plates and threaded within the respective block. Arranged at opposite sides of the rib 24 are similar plates 31 and 32 having disposed therebetween the blocks 33 and 34 secured in place by screws 35 and 36 passing through said plates 31 and 32. Similar plates 37 and 38 are arranged at opposite sides of center rib 25 and have associated therewith blocks 39 and 40 secured in place by screws 41 and 42.

The numeral 43 designates the other rectangular side member of the work-holder provided with the transverse offset end portions 44 and 45 and intermediate its ends with a rib 46. When the side member 43 is associated with the side member 22, the end portion 44 is received between plates 25 and 26; the opposite end portion 45 between plates 31 and 32; and the center rib 46 between plates 37 and 38. The side member is then secured in place by machine screws or the like 47, 48 and 49 passing therethrough and threaded within blocks 27, 39 and 33 respectively.

A plurality of glass mirror plates 10 to be ground are adapted to be carried by the work-holder B and are arranged in spaced parallel relation between the side members 22 and 43 of the holder, as clearly shown in the drawings. To facilitate the mounting of the mirror plates, the side member 22 is provided with pads 50 and 51 of rubber, rubber composition, or the like having grooves therein for receiving the bottom longitudinal edges 13 of the mirror plates, while the side member 43 carries pads 52 and 53 which engage the top longitudinal edges 12 of the mirror plates. When mounting the mirror plates within the work-holder, the screws 47, 48 and 49 are first loosened so that the side member 43 can be moved away from side member 22 sufficiently to permit the mirror plates to be inserted therebetween, after which the screws 47, 48 and 49 are tightened to clamp the mirror plates in place.

The work-holder B also includes the two removable end members 54 and 55 adapted to engage the opposite end edges of the mirror plates, but only one of these end members is in use at a time as will be more clearly hereinafter described. Each end member 54 and 55 comprises a longitudinally extending strip 56 to which is secured a pad 57 of rubber, rubber composition or the like having grooves for receiving the respective end edges of the mirror plates therein. Passing centrally through the strip 56 is a bolt 58 provided upon its outer end with a wing nut 59. Arranged between the plates 37 and 38 of the work-holder at the opposite ends thereof and between the spaced blocks 39 and 40 are additional blocks 60 and 61, each being secured in place by screws 62 and 63 passing through plates 37 and 38. The end members 54 and 55 are secured in place by threading the inner end of bolt 58 within an opening in the respective block 60 or 61.

Extending between the plates 25 and 26 adjacent one end thereof are the spaced, cylindrical rocker supports 64 and 65 and at the opposite end similar cylindrical rocker supports 66 and 67, while secured between the plates 31 and 32, at one end thereof, are the rocker supports 68 and 69 and at the opposite end rocker supports 70 and 71; said supports serving to support the work-holder B for rocking movement during the rounding of the corners 19 of the mirror plates. Also provided at opposite ends of the work-holder are handles 72 and 73 to facilitate the handling and actuation thereof.

After the glass mirror plates 10 have been properly mounted within the work-holder B, the work-holder is associated with the supporting means C and actuated to effect the grinding of the opposite end edges 17 and 18 and rounding of the corners 19 of the mirror plates. Encircling the grinding wheel A is a metal ring 74 having secured thereupon plates 75 and 76 arranged above the grinding wheel and carrying the supporting means C and rocking control means D. The supporting means C comprises a stationary bracket 77, the horizontal base 78 of which is secured to the plate 75 by bolts 79 passing through slots 80 in said base. Rising from the base 78 is a vertical plate 81 provided with a vertical guideway 82 in which is slidably received the vertical tongue 83 of casting 84. The casting 84 is mounted for vertical adjustment by means of an adjusting screw 85 passing loosely through the upper end 86 of bracket 77 and threaded through an ear 87 on casting 84. Secured to the front of the casting 84 at its lower end are spaced blocks 88 and 89 carrying the forwardly directed horizontal arms 90 and 91 respectively, each being provided in its upper edge with a pair of spaced transverse grooves 92 and 93, the corresponding grooves in the arms 90 and 91 being in alignment with one another. Rotation of the bolt 85 is effected by means of hand wheel 94 carried at the upper end thereof and provided with a hand gripping portion 95. In order to more accurately control the vertical adjustment of the work-holder, the wheel 94 may be provided around its periphery with suitable graduations 96, while carried by the bracket 77 is a member 97 having a pointer 98 associated with the graduations 96.

Figure 1:
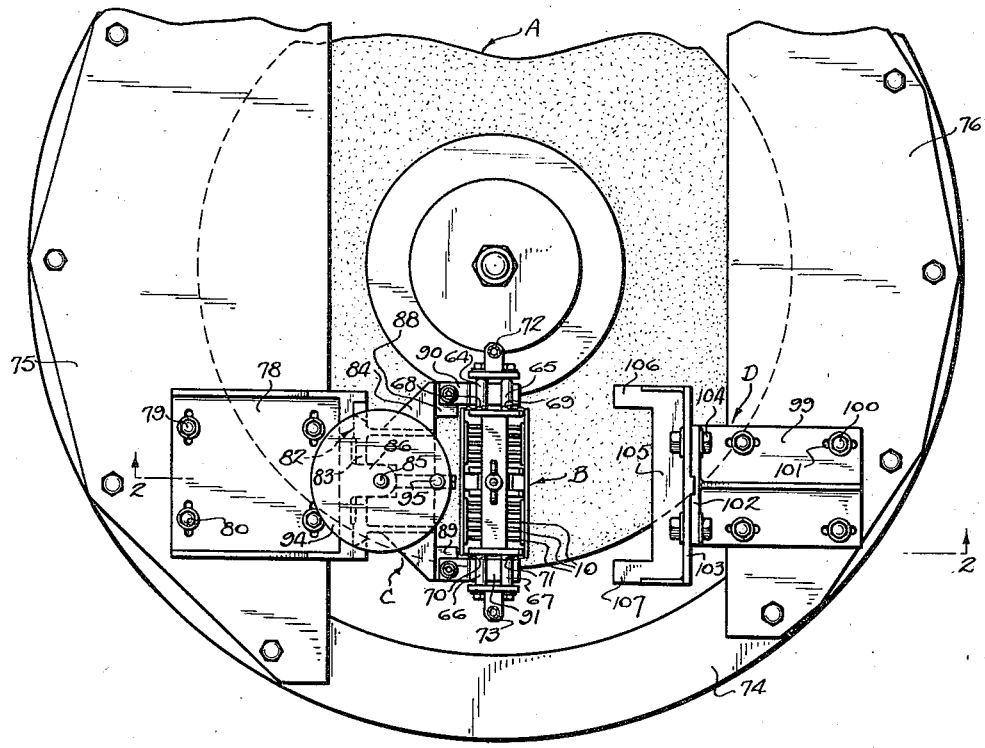
Fig. 1 is a plan view of a grinding apparatus constructed in accordance with the invention.
Figure 2:
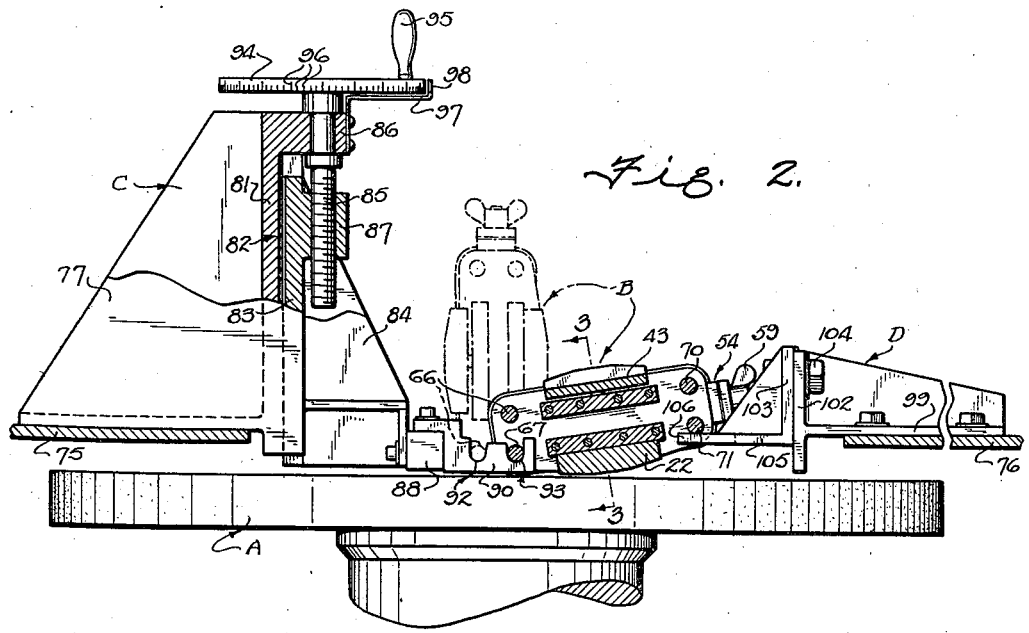
Fig. 2 is a vertical longitudinal sectional view therethrough taken substantially on line 2—2 of Fig. 1.
Figure 3:
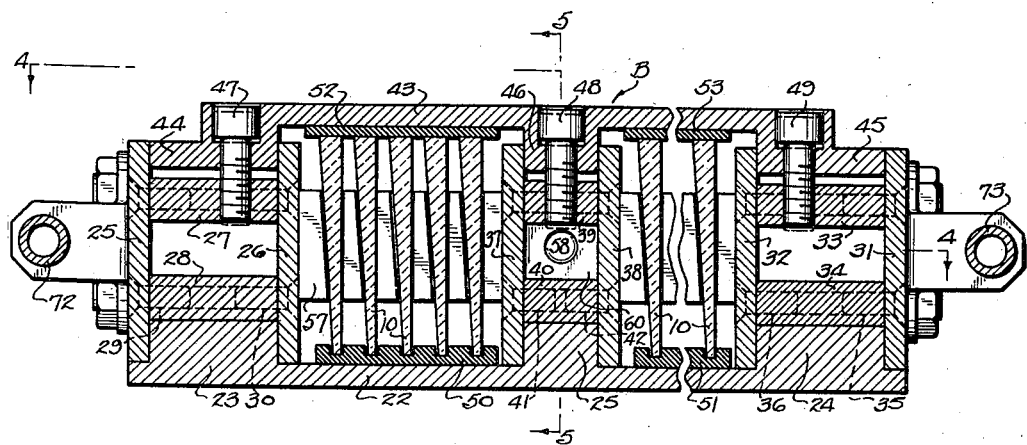
Fig. 3 is a transverse sectional view through the work-holder taken substantially on line 3—3 of Fig. 2.
Figure 4:
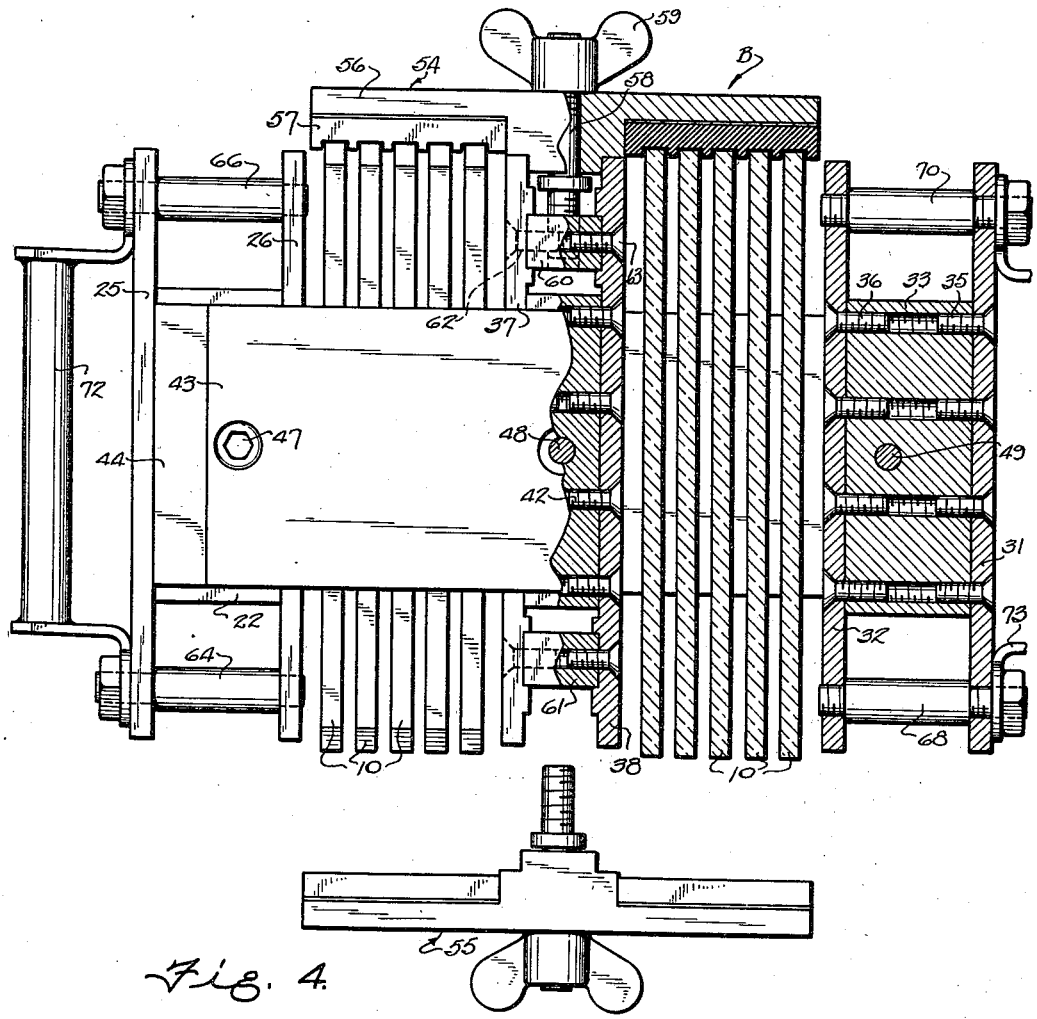
Fig. 4 is a plan view of the work-holder, partially in section, taken substantially on line 4—4 of Fig. 3.
Figure 5:
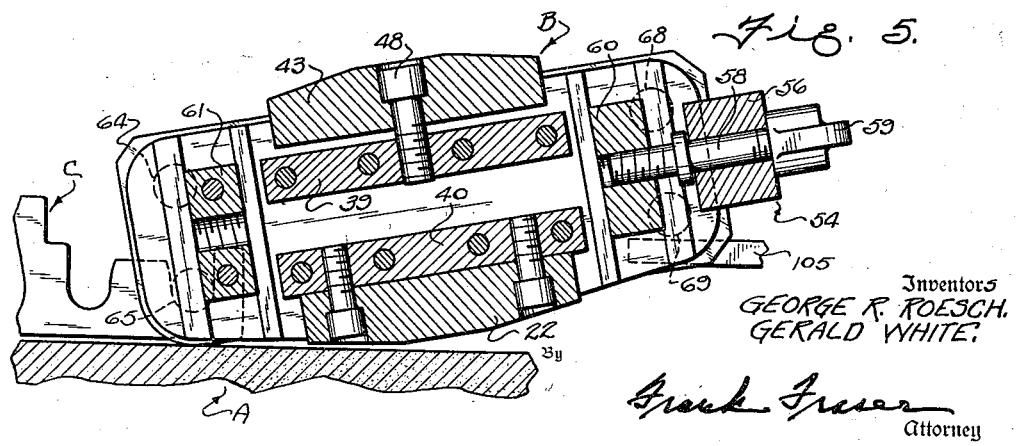
Fig. 5 is a longitudinal sectional view through the work-holder taken substantially on line 5—5 of Fig. 3.

In the operation of the apparatus above described, the work-holder B, with the glass mirror plates 10 properly secured therein, is associated with the supporting means C by arranging it in a vertical position as indicated in broken lines in Fig. 2, and in inserting the rocker supports 64 and 65 in the grooves 92 and 93 in arm 90 and the rocker supports 66 and 67 in the corresponding grooves in arm 91 as shown in Fig. 1. While in such vertical position, the bottom end edges of the mirror plates will engage the upper surface of the grinding wheel A and be subjected to the desired grinding action. After the end edges of the mirror plates have been ground, the work-holder is rocked upon the rocker supports 65 and 67 first to the right as shown in full lines in Fig. 2 and then back to vertical position to effect the rounding of one corner of the mirror plates. After the bottom end edges and one corner of the mirror plates have been ground, the work-holder is removed from the supporting means and turned about a vertical axis so that the rocker supports 65 and 66 will be engaged in grooves 93 and rocker supports 68 and 69 engaged in grooves 92. Upon rocking movement of the work-holder, the opposite corners of the plates at the same end thereof can be ground. During the grinding of the end edges 17 and corresponding corners 19 of the mirror plates, the opposite end member 54 is secured in place, while the end member 55 is removed as indicated in Fig. 4. After the end edges 17 and corresponding corners of the mirror plates have been ground, the work-holder is removed from the supporting means C, the end member 54 also removed, and the end member 55 secured in place. The work-holder is then reversed about a horizontal axis and the rocker supports 68, 69 and 70, 71 inserted in the grooves 92 and 93 in arms 89 and 90 respectively. The above operations are then repeated to effect the grinding of the end edges 18 and the rounding of the corresponding corners 19.

This invention also contemplates the provision of means for automatically controlling the amount of glass ground from the opposite end edges 17 and 18 of the mirror plates and also removed from the corners 19 thereof. In grinding the end edges, the work-holder is held in a vertical position as shown in broken lines in Fig. 2 and when the rocker supports engage the bottoms of the grooves 92 and 93 in arms 89 and 90, downward movement of the work-holder will be prevented and further grinding of the end edges also prevented. This is likewise true in rounding the corners of the mirror plates. That is to say, grinding of the corners will continue until the corners no longer contact the grinding wheel due to the fact that the rocker supports are engaged with the bottoms of the grooves 92 and 93.

In order to limit the extent of rocking movement of the work-holder B when swung to the right as viewed in Fig. 2, there is provided the rocking control means D; said means comprising a bracket 99 secured to the plate 76 by bolts 100 passing through slots 101 in said bracket. The bracket 99 is provided with a vertical front wall 102 to which is secured a substantially L-shaped member 103 by bolts or the like 104. The horizontal portion 105 of the L-shaped member 103 is provided at its opposite ends with the inwardly directed legs 106 and 107; said legs being engaged by the outer rocker supports to limit the extent of rocking movement of the work-holder as illustrated in Fig. 2.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. An apparatus for grinding the edges of plates of glass or the like having straight portions and rounded corners, comprising a horizontal grinding wheel rotatable about a substantially vertical axis, a work-holder for the plates mounted above said grinding wheel, and means for rockably supporting said work-holder so that it can be maintained in a vertical position to grind the straight portions of the edges of the plates and also rocked horizontally first in one direction and then the other to effect the grinding of the corners of said plates.

2. An apparatus for grinding the edges of plates of glass or the like having straight portions and rounded corners, comprising a horizontal grinding wheel rotatable about a substantially vertical axis, a work-holder for the plates mounted above said grinding wheel, means for rockably supporting said work-holder so that it can be maintained in a vertical position to grind the straight portions of the edges of the plates and also rocked horizontally first in one direction and then the other to effect the grinding of the corners of said plates, and means limiting the rocking movement of said work-holder.

3. An apparatus for grinding the edges of plates of glass or the like having straight portions and rounded corners, comprising a horizontal grinding wheel rotatable about a substantially vertical axis, a work-holder for the plates mounted above said grinding wheel, means for rockably supporting said work-holder so that it can be maintained in a vertical position to grind the straight portions of the edges of the plates and also rocked horizontally first in one direction and then the other to effect the grinding of the corners of said plates, and means for adjusting said work-holder supporting means vertically.

4. An apparatus for grinding the edges of plates of glass or the like having straight portions and rounded corners, comprising a horizontal grinding wheel rotatable about a subtantially vertical axis, a work-holder for the plates mounted above said grinding wheel, means for rockably supporting said work-holder so that it can be maintained in a vertical position to grind the straight portions of the edges of the plates and also rocked horizontally first in one direction and then the other to effect the grinding of the corners of said plates, means for adjusting said work-holder supporting means vertically, and means limiting the rocking movement of the said work-holder.

5. An edge grinding apparatus for grinding plates of glass or the like having straight opposite end edges and rounded corners, comprising a horizontal grinding wheel rotatable about a substantially vertical axis, a work-holder for the plates mounted above said grinding wheel, and means for rockably supporting said work-holder so that it can be maintained in a vertical position to grind the straight end edges of the plates and also rocked horizontally first in one direction and then the other to grind the corners of said plates, said work-holder being reversible about a vertical axis and also about a horizontal axis to effect the grinding of the opposite end edges and all four corners of the said plates.

6. An edge grinding apparatus for grinding plates of glass or the like having straight opposite end edges and rounded corners, comprising a horizontal grinding wheel rotatable about a substantially vertical axis, a work-holder for the plates mounted above said grinding wheel, means for rockably supporting said work-holder so that it can be maintained in a vertical position to grind the straight end edges of the plates and also rocked horizontally first in one direction and then the other to grind the corners of said plates, said work-holder being reversible about a vertical axis and also about a horizontal axis to effect the grinding of the opposite end edges and all four corners of the said plates, and means limiting the rocking movement of the said work-holder.

7. An edge grinding apparatus for grinding plates of glass or the like having straight opposite end edges and rounded corners, comprising a horizontal grinding wheel rotatable about a substantially vertical axis, a work-holder for the plates mounted above said grinding wheel, means for rockably supporting said work-holder so that it can be maintained in a vertical position to grind the straight end edges of the plates and also rocked horizontally first in one direction and then the other to grind the corners of said plates, said work-holder being reversible about a vertical axis and also about a horizontal axis to effect the grinding of the opposite end edges and all four corners of the said plates, and means for adjusting said work-holder supporting means vertically.

8. An apparatus for grinding the edges of plates of glass or the like having straight portions and rounded corners, comprising a horizontal grinding wheel rotatable about a substantially vertical axis, a work-holder for the plates mounted above said grinding wheel and including rocker supports, and means for rockably supporting said work-holder having grooves for receiving the rocker supports thereof whereby said work-holder can be maintained in a vertical position to grind the straight portions of the edges of the plates and also rocked horizontally first in one direction and then the other to effect the grinding of the corners of said plates.

9. An apparatus for grinding the edges of plates of glass or the like having straight portions and rounded corners, comprising a horizontal grinding wheel rotatable about a substantially vertical axis, a work-holder for the plates mounted above said grinding wheel and including rocker supports, means for rockably supporting said work-holder having grooves for receiving the rocker supports thereof whereby said work-holder can be maintained in a vertical position to grind the straight portions of the edges of the plates and also rocked horizontally first in one direction and then the other to effect the grinding of the corners of said plates, and means limiting the rocking movement of the said work-holder.

10. An apparatus for grinding the edges of plates of glass or the like having straight portions and rounded corners, comprising a horizontal grinding wheel rotatable about a substantially vertical axis, a work-holder for the plates mounted above said grinding wheel and including rocker supports, means for rockably supporting said work-holder having grooves for receiving the rocker supports thereof whereby said work-holder can be maintained in a vertical position to grind the straight portions of the edges of the plates and also rocked horizontally first in one direction and then the other to effect the grinding of the corners of said plates, and means for adjusting said work-holder supporting means vertically.

11. An edge grinding apparatus for grinding plates of glass or the like having straight opposite end edges and rounded corners, comprising a horizontal grinding wheel rotatable about a substantially vertical axis, a work-holder for the plates mounted above said grinding wheel and including rocker supports, and means for rockably supporting said work-holder having grooves for receiving said rocker supports therein and upon which said work-holder can be maintained in a vertical position to grind the straight end edges of the plates and also rocked horizontally first in one direction and then the other to effect the grinding of the corners of said plates, said work-holder being reversible about a vertical axis and also about a horizontal axis to effect the grinding of the opposite end edges and all four corners of the said plates.

12. An edge grinding apparatus for grinding plates of glass or the like having straight opposite end edges and rounded corners, comprising a horizontal grinding wheel rotatable about a substantially vertical axis, a work-holder for the plates mounted above said grinding wheel and including rocker supports, means for rockably supporting said work-holder having grooves for receiving said rocker supports therein and upon which said work-holder can be maintained in a vertical portion to grind the straight end edges of the plates and also rocked horizontally first in one direction and then the other to effect the grinding of the corners of said plates, said work-holder being reversible about a vertical axis and also about a horizontal axis to effect the grinding of the opposite end edges and all four corners of the said plates, and means limiting the rocking movement of the said work-holder.

13. An edge grinding apparatus for grinding plates of glass or the like having straight opposite end edges and rounded corners, comprising a horizontal grinding wheel rotatable about a substantially vertical axis, a work-holder for the plates mounted above said grinding wheel and including rocker supports, means for rockably supporting said work-holder having grooves for receiving said rocker supports therein and upon which said work-holder can be maintained in a vertical position to grind the straight end edges of the plates and also rocked horizontally first in one direction and then the other to effect the grinding of the corners of said plates, said work-holder being reversible about a vertical axis and also about a horizontal axis to effect the grinding of the opposite end edges and all four corners of the said plates, and means for adjusting said work-holder supporting means vertically.

GEORGE R. ROESCH.
GERALD WHITE.